United States Patent
Akiyama et al.

(10) Patent No.: US 9,564,975 B2
(45) Date of Patent: Feb. 7, 2017

(54) OPTICAL TRANSMISSION DEVICE, METHOD OF OPTICAL TRANSMISSION, AND NON-TRANSITORY COMPUTER-READABLE MEDIUM

(71) Applicant: FUJITSU LIMITED, Kawasaki-shi, Kanagawa (JP)

(72) Inventors: Yuichi Akiyama, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/075,369

(22) Filed: Nov. 8, 2013

(65) Prior Publication Data
US 2014/0140707 A1  May 22, 2014

(30) Foreign Application Priority Data
Nov. 21, 2012  (JP) ................. 2012-255440

(51) Int. Cl.
| | |
|---|---|
| H04B 10/00 | (2013.01) |
| H04B 10/516 | (2013.01) |
| H04B 10/50 | (2013.01) |
| H04B 10/588 | (2013.01) |
| H04J 14/06 | (2006.01) |
| H04L 27/20 | (2006.01) |

(52) U.S. Cl.
CPC ........ *H04B 10/516* (2013.01); *H04B 10/5053* (2013.01); *H04B 10/588* (2013.01); *H04J 14/06* (2013.01); *H04L 27/2096* (2013.01)

(58) Field of Classification Search
CPC . H04B 10/516; H04B 10/588; H04B 10/5053; H04J 14/06; H04J 14/02; H04L 27/34
USPC ................... 398/195, 198; 359/239
See application file for complete search history.

(56) References Cited

U.S. PATENT DOCUMENTS

| | | | | |
|---|---|---|---|---|
| 5,161,044 A | * | 11/1992 | Nazarathy ................ | H04B 1/62 398/194 |
| 5,850,305 A | * | 12/1998 | Pidgeon ............. | H04B 10/5051 372/32 |
| 5,973,816 A | * | 10/1999 | Akiyama .............. | G02F 1/0327 356/73.1 |
| 6,362,913 B2 | * | 3/2002 | Ooi et al. ...................... | 359/245 |

(Continued)

FOREIGN PATENT DOCUMENTS

JP   2010-109705   5/2010

OTHER PUBLICATIONS

Extended European Search Report mailed Mar. 6, 2014 in corresponding European Application No. 13192286.6.

(Continued)

*Primary Examiner* — Ken N Vanderpuye
*Assistant Examiner* — Amritbir Sandhu
(74) *Attorney, Agent, or Firm* — Staas & Halsey LLP

(57) ABSTRACT

An optical transmission device includes: a drive signal generate unit that generates a drive signal; a modulation unit that modulates an optical signal in accordance with the drive signal; a detect unit that detects a fluctuation of a signal component of the drive signal with respect to an optical signal output by the modulation unit; and a correct unit that corrects a parameter of the drive signal generate unit in accordance with a detect result of the detect unit so that a non-linear characteristic of the modulation unit gets closer to a linear characteristic.

8 Claims, 14 Drawing Sheets

(56) References Cited

U.S. PATENT DOCUMENTS

| | | | |
|---|---|---|---|
| 6,556,728 B2* | 4/2003 | Olesen | G02F 1/0123 385/2 |
| 6,570,698 B2* | 5/2003 | Kim | G02F 1/0123 359/237 |
| 6,671,465 B1 | 12/2003 | Cohen et al. | |
| 6,687,466 B1* | 2/2004 | Chiappetta | H04B 10/504 330/149 |
| 6,836,622 B2* | 12/2004 | Kobayashi et al. | 398/198 |
| 7,046,414 B2* | 5/2006 | Ohhira | 359/238 |
| 7,200,343 B2* | 4/2007 | Ikeuchi | G02F 1/0123 359/239 |
| 7,257,332 B2* | 8/2007 | Imai et al. | 398/198 |
| 7,308,210 B2* | 12/2007 | Khayim et al. | 398/198 |
| 7,382,984 B2* | 6/2008 | McNicol | H04B 10/25137 398/147 |
| 7,412,174 B2* | 8/2008 | Iannelli | H04B 10/503 398/159 |
| 7,426,350 B1 | 9/2008 | Sun et al. | |
| 7,561,810 B2* | 7/2009 | Noguchi et al. | 398/198 |
| 7,630,651 B2* | 12/2009 | Shimizu et al. | 398/198 |
| 7,672,033 B2* | 3/2010 | Kobayashi et al. | 359/238 |
| 7,773,283 B2* | 8/2010 | Tanaka et al. | 359/237 |
| 7,817,923 B2* | 10/2010 | Akiyama et al. | 398/188 |
| 8,145,067 B2* | 3/2012 | Nagayama et al. | 398/195 |
| 8,391,724 B2* | 3/2013 | Aruga | H04B 10/5053 359/238 |
| 8,457,503 B2* | 6/2013 | Akiyama | 398/188 |
| 8,463,138 B2* | 6/2013 | Sugihara et al. | 398/197 |
| 8,472,810 B2* | 6/2013 | Akiyama et al. | 398/184 |
| 8,532,499 B2* | 9/2013 | Caton | H04B 10/5051 359/245 |
| 8,582,981 B2* | 11/2013 | Akiyama et al. | 398/188 |
| 2002/0171900 A1* | 11/2002 | Ono | H04B 10/50572 398/183 |
| 2003/0210915 A1* | 11/2003 | Miyata | H04B 10/50575 398/198 |
| 2004/0161249 A1* | 8/2004 | Suda | H04B 10/503 398/198 |
| 2004/0190910 A1* | 9/2004 | Akiyama | G02F 1/0121 398/186 |
| 2004/0218931 A1* | 11/2004 | Frederiksen, Jr. | G02F 1/0123 398/198 |
| 2006/0204162 A1* | 9/2006 | Stook et al. | 385/3 |
| 2007/0047969 A1* | 3/2007 | Nakashima et al. | 398/198 |
| 2007/0092266 A1* | 4/2007 | Shimizu | H04B 10/505 398/198 |
| 2007/0212079 A1* | 9/2007 | Ooi | H04B 10/505 398/198 |
| 2007/0269223 A1* | 11/2007 | Noguchi | H04B 10/505 398/198 |
| 2008/0080872 A1* | 4/2008 | Tanaka et al. | 398/186 |
| 2008/0130083 A1* | 6/2008 | Yasuda | H04B 10/588 359/238 |
| 2008/0158640 A1* | 7/2008 | Watanabe | G02F 1/0123 359/239 |
| 2008/0219678 A1* | 9/2008 | Doi | G02F 1/0123 398/198 |
| 2008/0239448 A1* | 10/2008 | Tanaka et al. | 359/245 |
| 2009/0201564 A1* | 8/2009 | Tian | G02F 1/0123 359/239 |
| 2010/0080571 A1* | 4/2010 | Akiyama | G02F 1/0123 398/184 |
| 2010/0104284 A1 | 4/2010 | Liu et al. | |
| 2010/0111531 A1 | 5/2010 | Tanimura et al. | |
| 2010/0119239 A1* | 5/2010 | Wang | H04B 10/50575 398/198 |
| 2010/0254715 A1* | 10/2010 | Yamashita et al. | 398/188 |
| 2012/0155880 A1* | 6/2012 | Nishimoto | H04B 10/50572 398/79 |
| 2012/0243874 A1* | 9/2012 | Logan, Jr. | H04B 10/25759 398/116 |
| 2014/0334830 A1* | 11/2014 | Pierrottet | H04B 10/548 398/187 |

OTHER PUBLICATIONS

Japanese Office Action dated Jul. 5, 2016 in corresponding Japanese Patent Application No. 2012-255440.

* cited by examiner

FIG. 3C  $F(t)=f(t)+h(t)$

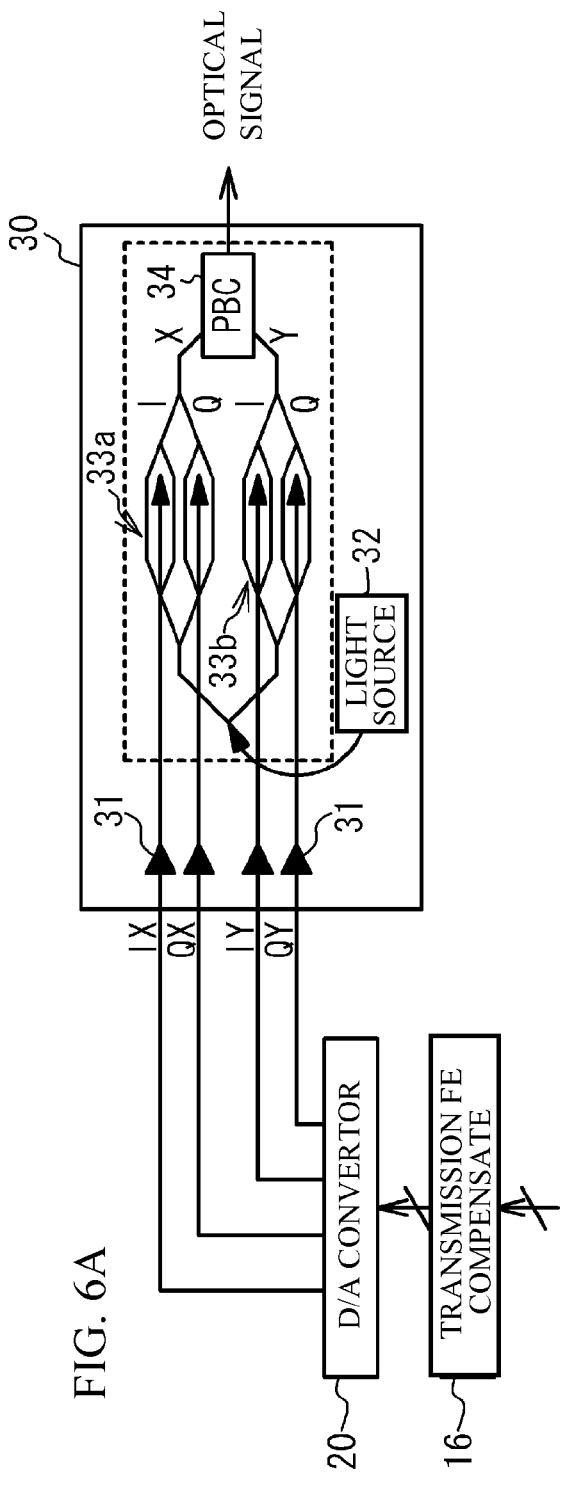
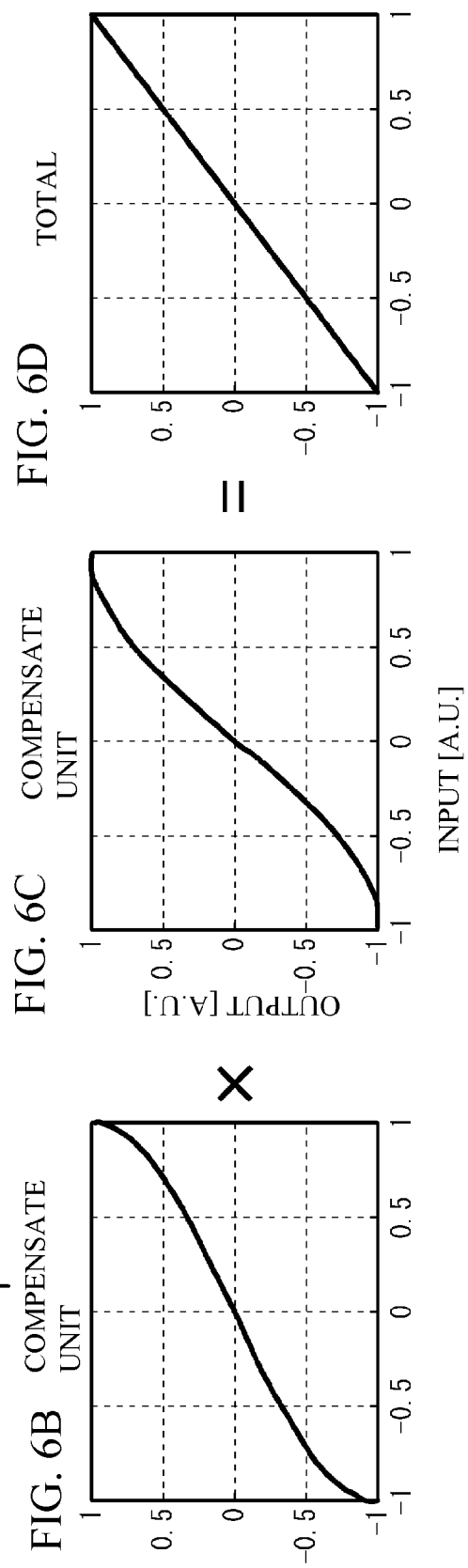
FIG. 6A
FIG. 6B
FIG. 6C
FIG. 6D

=

+

OPTICAL TRANSMISSION DEVICE, METHOD OF OPTICAL TRANSMISSION, AND NON-TRANSITORY COMPUTER-READABLE MEDIUM

CROSS-REFERENCE TO RELATED APPLICATION

This application is based upon and claims the benefit of priority of the prior Japanese Patent Application No. 2012-255440, filed on Nov. 21, 2012, the entire contents of which are incorporated herein by reference.

FIELD

A certain aspect of embodiments described herein relates to an optical transmission device, a method of optical transmission, and a non-transitory computer-readable medium.

BACKGROUND

Japanese Patent Application Publication No. 2010-109705 discloses a technology in which a digital signal process on a side of transmission is performed with respect to a signal input into a modulator in order to achieve a long-distance and large-capacity communication system. In an optical transmission device, it is preferable that a non-linear characteristic of the modulator is compensated for.

SUMMARY

According to an aspect of the present invention, there is provided an optical transmission device including: a drive signal generate unit that generates a drive signal; a modulation unit that modulates an optical signal in accordance with the drive signal; a detect unit that detects a fluctuation of a signal component of the drive signal with respect to an optical signal output by the modulation unit; and a correct unit that corrects a parameter of the drive signal generate unit in accordance with a detect result of the detect unit so that a non-linear characteristic of the modulation unit gets closer to a linear characteristic.

BRIEF DESCRIPTION OF DRAWINGS

FIG. 3C illustrates a signal F(t);

FIG. 6A to FIG. 6D illustrate a compensation of non-linear characteristic;

DESCRIPTION OF EMBODIMENTS

It is difficult to compensate for a non-linear characteristic of a modulator because the non-linear characteristic may fluctuate according to a wave form such as amplitude or a frequency of a drive signal.

The following is a description of embodiments, with reference to the accompanying drawings.

[First Embodiment]

Figure 1:
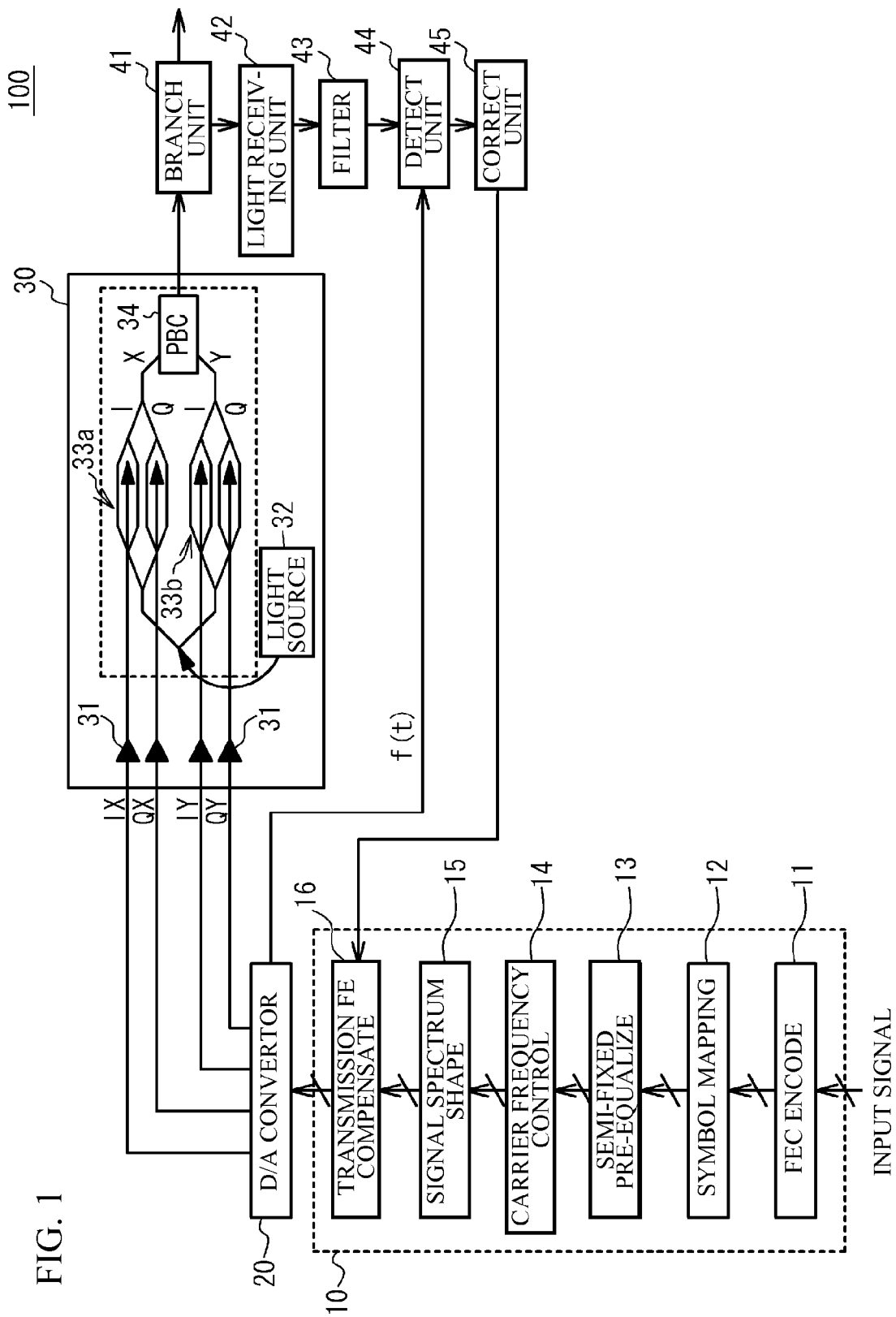
FIG. 1 illustrates a block diagram of a main structure of an optical transmission device in accordance with a first embodiment.

FIG. 1 illustrates a block diagram of a main structure of an optical transmission device 100 in accordance with a first embodiment. The optical transmission device 100 has a digital signal processing unit 10, a D/A converter 20, a polarization-multiplexing modulation unit 30, a branch unit 41, a light-receiving unit 42, a filter 43, a detect unit 44, a correct unit 45 and so on. The digital signal processing unit 10 has a FEC encode unit 11, a symbol mapping unit 12, a semi-fixed pre-equalize unit 13, a carrier frequency control unit 14, a signal spectrum shape unit 15 and a transmission FE (Front End) compensate unit 16. The digital signal processing unit 10 acts as a drive signal generate unit for generating a drive signal. The polarization-multiplexing modulation unit 30 has a plurality of electrical amplifiers 31, a light source 32, a QPSK modulation units 33a and 33b, and a multiplex unit 34. In the embodiment, the QPSK modulation units 33a and 33b are used. However, a modulator that is capable of multiple-value modulating such as a 16QAM may be used.

The FEC encode unit 11 performs an encoding of FEC (Forward Error Correction) with respect to a main signal (input signal) that is input into the digital signal processing unit 10. The symbol mapping unit 12 performs a symbol mapping of phase with respect to a signal received from the FEC encode unit 11. The semi-fixed pre-equalize unit 13 performs a pre-equalizing process with respect to a signal received from the symbol mapping unit 12. The carrier frequency control unit 14 controls a frequency of a carrier wave of a signal received from the semi-fixed pre-equalize unit 13. The signal spectrum shape unit 15 performs a shaping process with respect to a spectrum of a signal received from the carrier frequency control unit 14. The transmission FE compensate unit 16 performs a compensating process of a linear characteristic or the like with respect to a signal received from the signal spectrum shape unit 15. The digital signal processing unit 10 outputs a drive signal as a result of the processes of each unit.

The D/A convertor 20 is a digital/analog convertor that converts each drive signal (a digital signal) output by the digital signal processing unit 10 into an analog signal. The D/A convertor 20 converts each drive signal output from the digital signal processing unit 10 into a drive signal IX of an I-component of an X-polarization wave, a drive signal QX of a Q-component of the X-polarization wave, a drive signal IY of an I-component of a Y-polarization wave, and a drive signal QY of a Q-component of the Y-polarization wave. The I-component is an In-phase component. The Q-component is a Quadrature component.

The polarization-multiplexing modulation unit 30 outputs a modulation signal by modulating the I-component and the Q-component of each polarization wave of an output light of the light source 32 and multiplexing the modulated components. The electrical amplifier 31 is not limited to a specific amplifier. The electrical amplifier 31 is, for example, a semiconductor amplifier. The electrical amplifier 31 is provided according to each component of the X-polarization wave and the Y-polarization wave. In the embodiment, the number of the electrical amplifier 31 is four in accordance with each component of the X-polarization wave and the Y-polarization wave. Each electrical amplifier 31 amplifies each component of the X-polarization wave and the Y-polarization wave output by the D/A convertor 20 to an adequate drive amplitude and applies the amplified components to the QPSK modulation units 33a and 33b. The light source 32 is not limited to a specific light source. The light source 32 is, for example, a semiconductor laser.

The QPSK modulation units 33a and 33b respectively have two Mach-Zehnder modulation units in parallel. Modulation units in the QPSK modulation units 33a and 33b are not limited to a specific modulation unit. The modulated units are, for example, a Mach-Zehnder modulation unit using an electrooptical crystal such as a LiNbO$_3$ (LN) substrate or a LiTaO$_2$ substrate. In the embodiment, the QPSK modulation unit 33a acts as a modulator for the X-polarization wave, and the QPSK modulation unit 33b acts as a modulator for the Y-polarization wave.

A light output by the light source 32 is divided into four components of the I-component and the Q-component of the X-polarization wave and the Y-polarization wave, and input into a waveguide of each modulation unit of the QPSK modulation units 33a and 33b. Each drive signal output by each electrical amplifier 31 is applied to an arm of each modulation unit. The QPSK modulation unit 33a outputs a QPSK modulation signal of the X-polarization wave. The QPSK modulation unit 33b outputs a QPSK modulation signal of the Y-polarization wave. The multiplex unit 34 is a PBC (Polarization Beam Combiner) for multiplexing the QPSK modulation signals output by the QPSK modulation units 33a and 33b. The modulation signal multiplexed by the multiplex unit 34 is output as an optical signal.

Figure 2A:
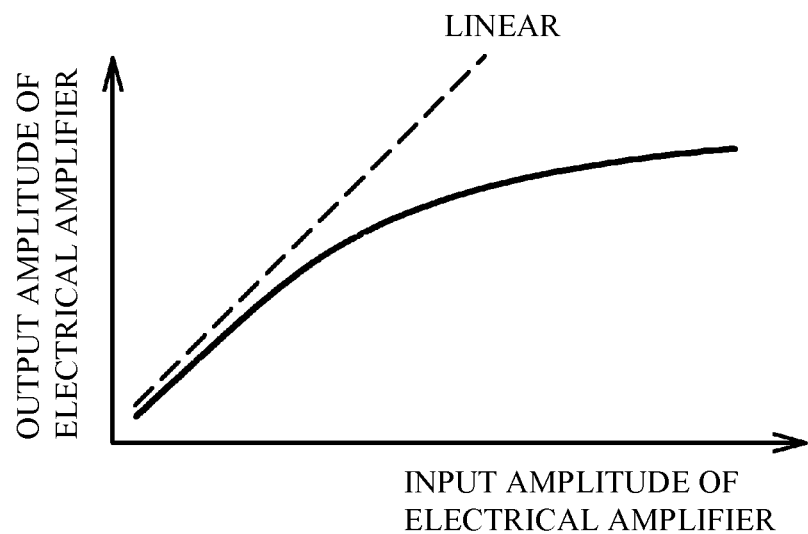
FIG. 2A illustrates an input-output characteristic of a normal electrical amplifier.
Figure 2B:
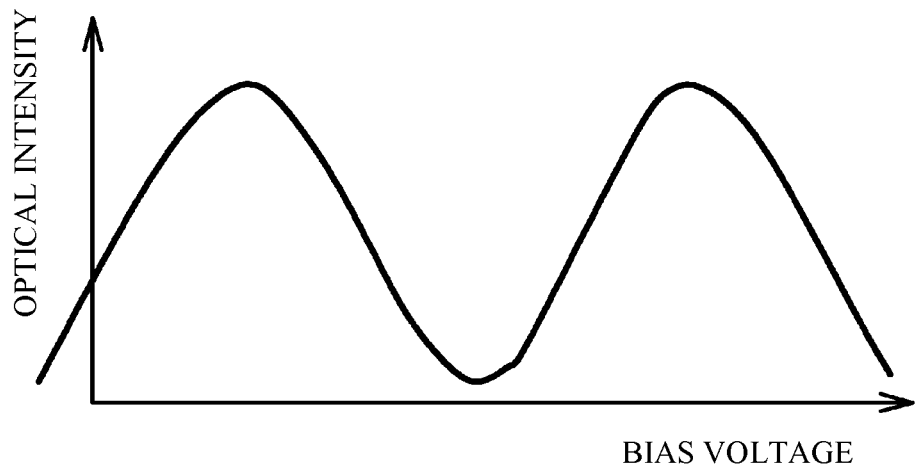
FIG. 2B illustrates an extinction characteristic of a normal Mach-Zehnder modulation unit.

Here, a description will be given of a characteristic of the electrical amplifier 31 and each modulation unit of the polarization-multiplexing modulation unit 30. FIG. 2A illustrates an input-output characteristic of a typical electrical amplifier. With reference to FIG. 2A, the electrical amplifier has a non-linear characteristic in which output amplitude is saturated gradually as input amplitude increases. The electrical amplifier 31 of the embodiment has the characteristic of FIG. 2A. FIG. 2B illustrates an extinction characteristic of a normal Mach-Zehnder. With reference to FIG. 2B, an output optical intensity of the Mach-Zehnder modulation unit approximately has a cyclic characteristic of a square of cosine with respect to a bias voltage applied to the Mach-Zehnder modulation unit. In the embodiment, each modulation unit of the QPSK modulation units 33a and 33b has the extinction characteristic of FIG. 2B. The polarization-multiplexing modulation unit 30 has a non-linear characteristic as a whole because of the non-linear characteristics of the electrical amplifier and the modulation unit.

In the optical transmission device 100, the polarization-multiplexing modulation unit 30 has the non-linear characteristic. Therefore, a modulation signal obtained by applying of a drive signal differs from a modulation signal that is estimated in a case where the polarization-multiplexing modulation unit 30 has a linear characteristic. And so, the optical transmission device 100 superimposes a signal component reflected in the modulation signal output by the polarization-multiplexing modulation unit 30 to a drive signal as a superimposed signal, and detects the non-linear characteristic of the polarization-multiplexing modulation unit 30 by detecting a changing of the reflection of the superimposed signal. The transmission FE compensate unit 16 of the digital signal processing unit 10 compensates for the detected non-linear characteristic.

A description will be given of a principle of compensation of the non-linear characteristic. As an example, a description will be given of an example of a compensation of non-linear characteristic in which the electrical amplifier 31 and the Mach-Zehnder modulation unit for the I-component of the QPSK modulation unit 33a. In a drive signal F(t), a superimposed signal h(t) is superimposed in a reference signal f(t). The drive signal F(t)=f(t)+h(t) is input into the electrical amplifier 31 for the I-component of the QPSK modulation unit 33a.

Figure 3A:
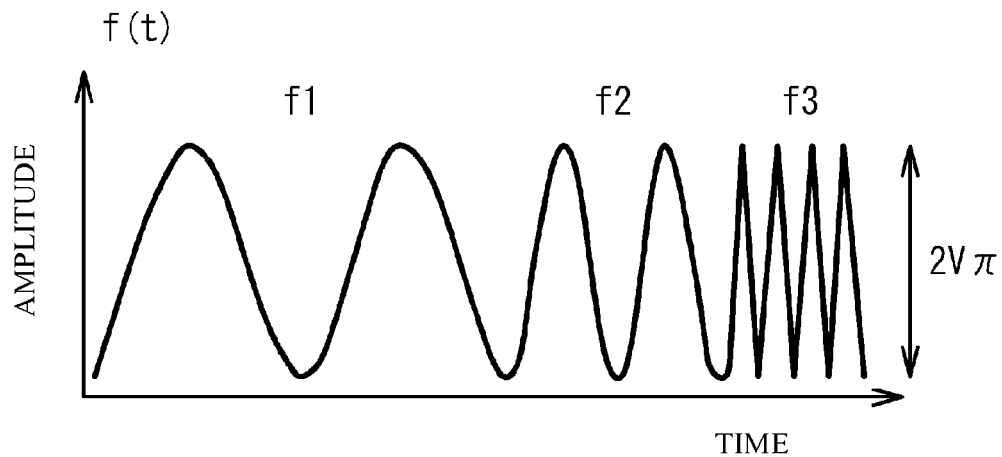
FIG. 3A illustrates a drive signal f(t)
Figure 3B:
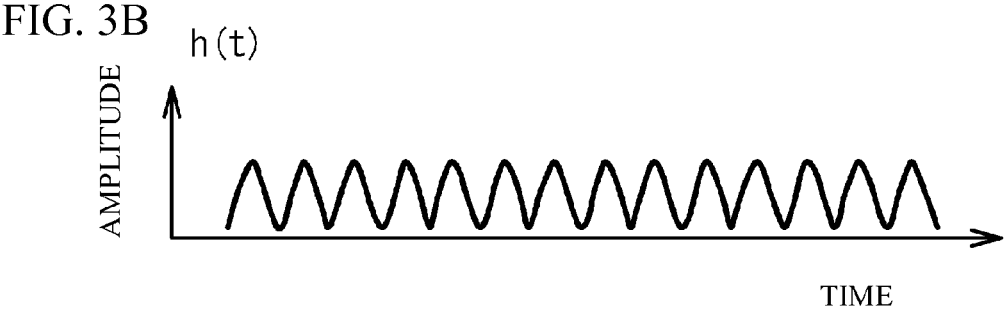
FIG. 3B illustrates a superimposed signal h(t)
Figure 3B:
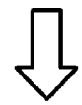
Figure 3B:
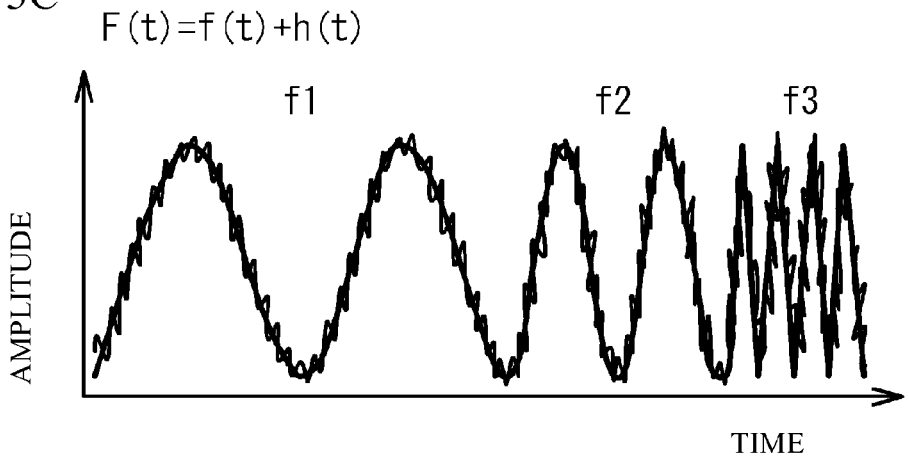
Figure 4:
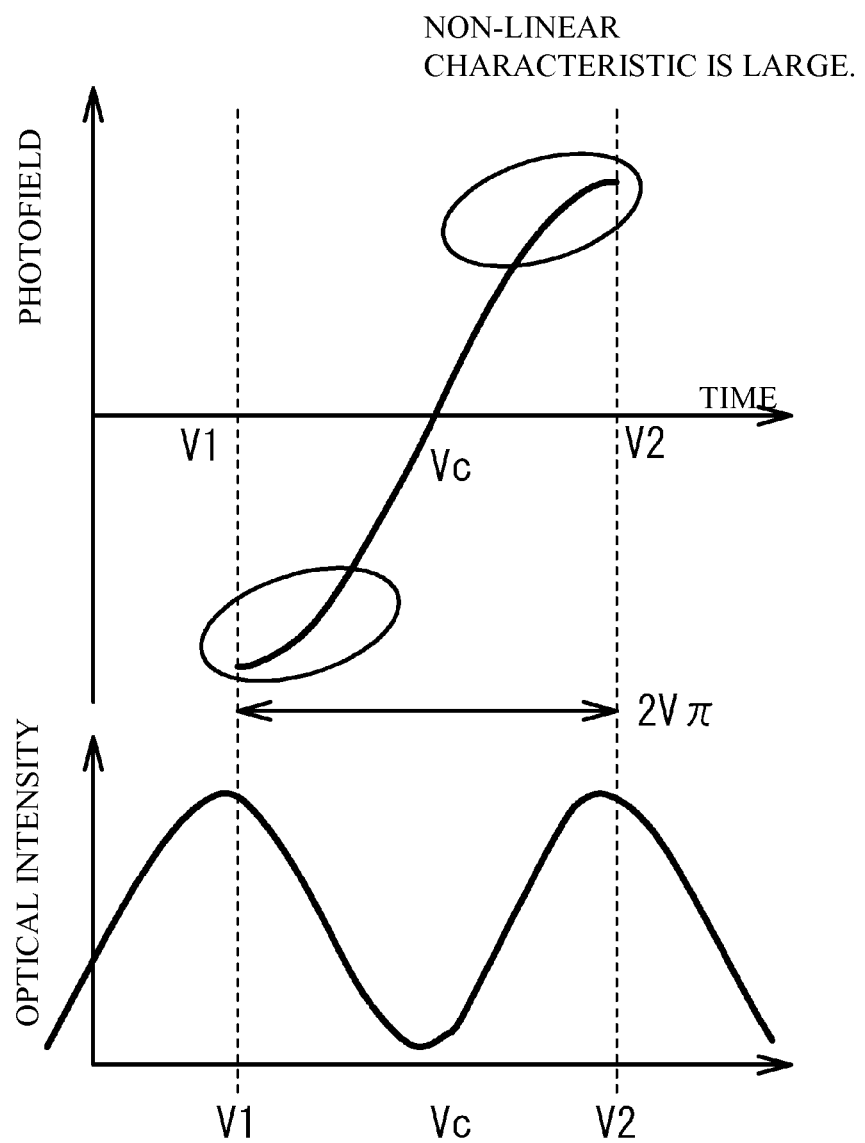
FIG. 4 illustrates a non-linear characteristic of a Mach-Zehnder modulation unit.

FIG. 3A illustrates the reference signal f(t). The reference signal f(t) indicates amplitude after amplification of the electrical amplifier 31. With reference to FIG. 3A, the reference signal f(t) is a signal of which frequency fluctuates in accordance with a time. In the example of FIG. 3A, the frequency of the reference signal f(t) fluctuates from f1 to f3, and gets higher as the time passes. With reference to FIG. 4, the amplitude of the reference signal f(t) corresponds to a voltage of 2Vπ corresponding to a mountain (a local maximum value), a valley (a local minimum value) and another mountain (another local maximum) of the extinction characteristic of each Mach-Zehnder modulation unit. That is, the amplitude of the reference signal f(t) is V1 to V2 of FIG. 4. FIG. 3B illustrates the superimposed signal h(t). With reference to FIG. 3B, the superimposed signal h(t) is a signal of which frequency is constant. The amplitude of the superimposed signal h(t) is smaller than that of the reference signal f(t), and may be adjusted in accordance with a sensitivity in a signal detection.

With reference to FIG. 1 again, the D/A convertor 20 has a port for outputting the drive signal F(t) and another port for outputting the reference signal f(t) in addition to the port. The D/A convertor 20 outputs the reference signal f(t) from the another port and inputs the reference signal f(t) into the detect unit 44. That is, the D/A convertor 20 acts as an input unit for inputting the reference signal to the detect unit 44. The branch unit 41 branches a part of an optical signal output by a Mach-Zehnder modulation unit that is an objective of detection and inputs the branched signal into the light-receiving unit 42. The light-receiving unit 42 converts the optical signal into an electrical signal by a photoelectric conversion. The filter 43 extracts a signal component corresponding to the superimposed signal h(t) from an electrical signal output by the light-receiving unit 42. The detect unit 44 is an oscilloscope or the like, and monitors the above-mentioned signal component with use of the reference signal f(t) output from the second port of the D/A convertor 20.

Figure 5A:
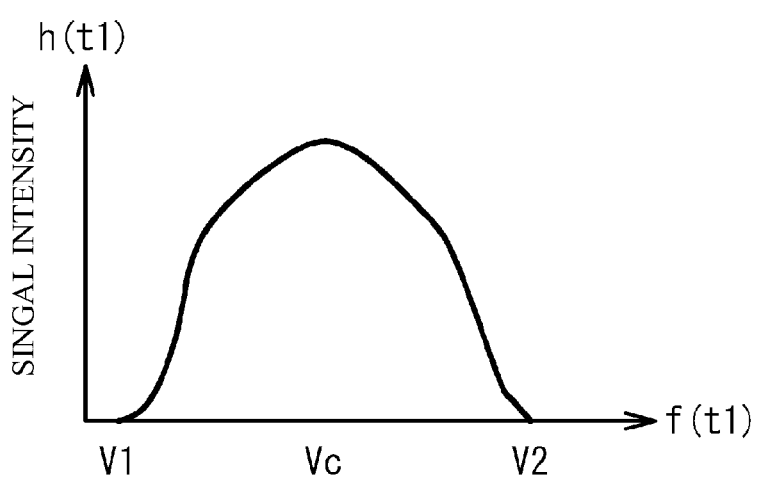
FIG. 5A illustrates a wave form monitored by a detect unit at a time $t_1$.

FIG. 5A illustrates a waveform monitored by the detect unit 44 at a time t1 (f(t)=A cos ω1t1 (ω is an angular frequency)). The waveform is a wave form in a section in which the frequency of the reference signal f(t) is f1 in the drive signal F(t) of FIG. 3C. Voltages V1, V2, and Vc of FIG. 5A are respectively a bottom voltage V1, a top voltage V2 and a center voltage between V1 and V2 in a fluctuation of photofield illustrated in an upper part of FIG. 4. Voltages V1, V2 and Vc of FIG. 5A are respectively a left local maximum peak voltage V1, a right local maximum peak voltage V2 and a center voltage Vc (a local minimum peak) between V1 and V2 in an extinction curve illustrated in a lower part of FIG. 4.

With reference to FIG. 3C again, in each amplitude value (horizontal axis) of the reference signal f(t), the superimposed signal h(t) changes because of the non-linear characteristic of the electrical amplifier 31 and the Mach-Zehnder modulation unit. In concrete, with reference to the upper part of FIG. 4, the non-linear characteristic of the Mach-Zehnder modulation unit appears strongly around the voltage V1 and the voltage V2. Because of the non-linear characteristic, a distortion may occur in the superimposed signal h(t). Thus, an intensity of the signal component extracted by the filter 43 gets smaller. On the other hand, the characteristic of the Mach-Zehnder modulation unit is approximately linear near the voltage Vc. Therefore, the intensity of the signal component extracted by the filter 43 becomes a maximum.

Figure 5B:
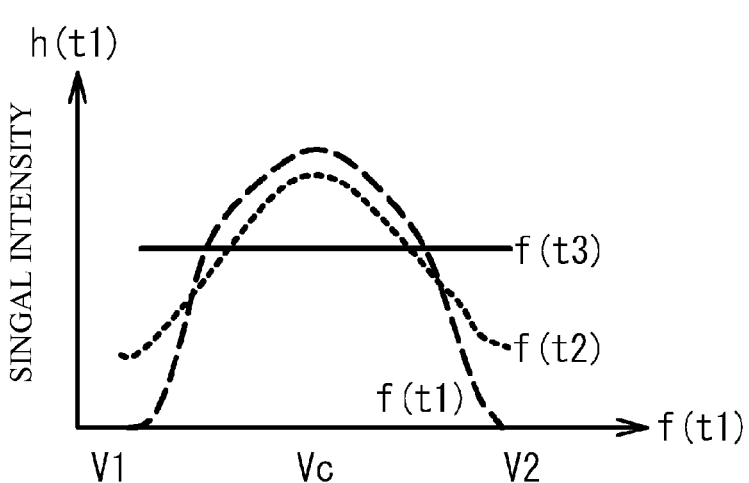
FIG. 5B illustrates an overlapped graph of non-linear characteristic of each frequency.

The non-linear characteristic of the Mach-Zehnder modulation unit is a frequency response characteristic. Therefore, the non-linear characteristic changes in accordance with a frequency when amplitude of an input drive signal is constant. The non-linear characteristic of the electrical amplifier 31 may fluctuate in accordance with a frequency of an input drive signal. FIG. 5B illustrates an overlapped graph of non-linear characteristic of each frequency. FIG. 5B illustrates a waveform in a case where $f(t_1)$ at time $t_1$ is A cos $ω_1t_1$, $f(t_2)$ at time $t_2$ is A cos $ω_2t_2$, and $f(t_3)$ at time $t_3$ is A cos $ω_3t_3$. A relation $f(t_1)<f(t_2)<f(t_3)$ is satisfied. With reference to FIG. 5B, the non-linear characteristic of the electrical amplifier 31 and the Mach-Zehnder modulation unit fluctuates in accordance with a frequency of an input drive signal. In concrete, when the frequency gets higher, the non-linear characteristic of the electrical amplifier 31 and the Mach-Zehnder modulation unit is reduced and a characteristic close to a linear characteristic appears.

Figure 5C:
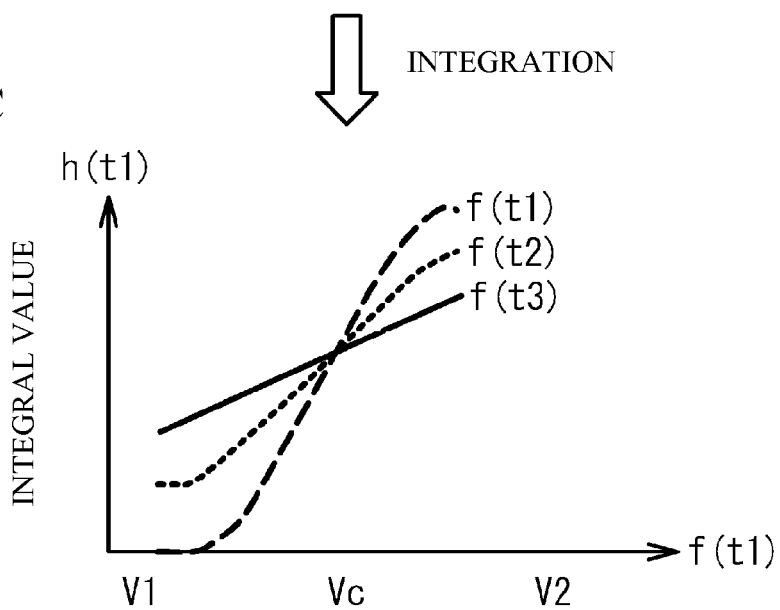
FIG. 5C illustrates a non-linear characteristic of an electrical amplifier and a Mach-Zehnder modulation unit obtained by integrating.

In the example of FIG. 5B, approximately linear characteristic is obtained when $f(t_3)$ is A cos $ω_3t_3$. Therefore, an intensity of a signal component extracted by the filter 43 is detected as an approximately constant value in spite of a drive voltage. The detect unit 44 detects a non-linear characteristic at each frequency of the electrical amplifier 31 and the Mach-Zehnder modulation unit by integrating the characteristic obtained in FIG. 5B. FIG. 5C illustrates a non-linear characteristic of the electrical amplifier 31 and the Mach-Zehnder modulation unit obtained by integrating.

When the electrical amplifier 31 has a linear characteristic, FIG. 5C is a non-linear characteristic of the Mach-Zehnder modulation unit.

The correct unit 45 corrects a parameter of the transmission FE compensate unit 16 so that the non-linear characteristic detected by the detect unit 44 gets closer to a linear characteristic (the non-linear characteristic is reduced). It is preferable that the correct unit 45 generates an opposite characteristic to achieve a linear characteristic by being multiplied by the non-linear characteristic detected by the detect unit 44 as illustrated in FIG. 6B to FIG. 6D, and a parameter achieving the opposite characteristic is set in the transmission FE compensate unit 16.

Figure 7:
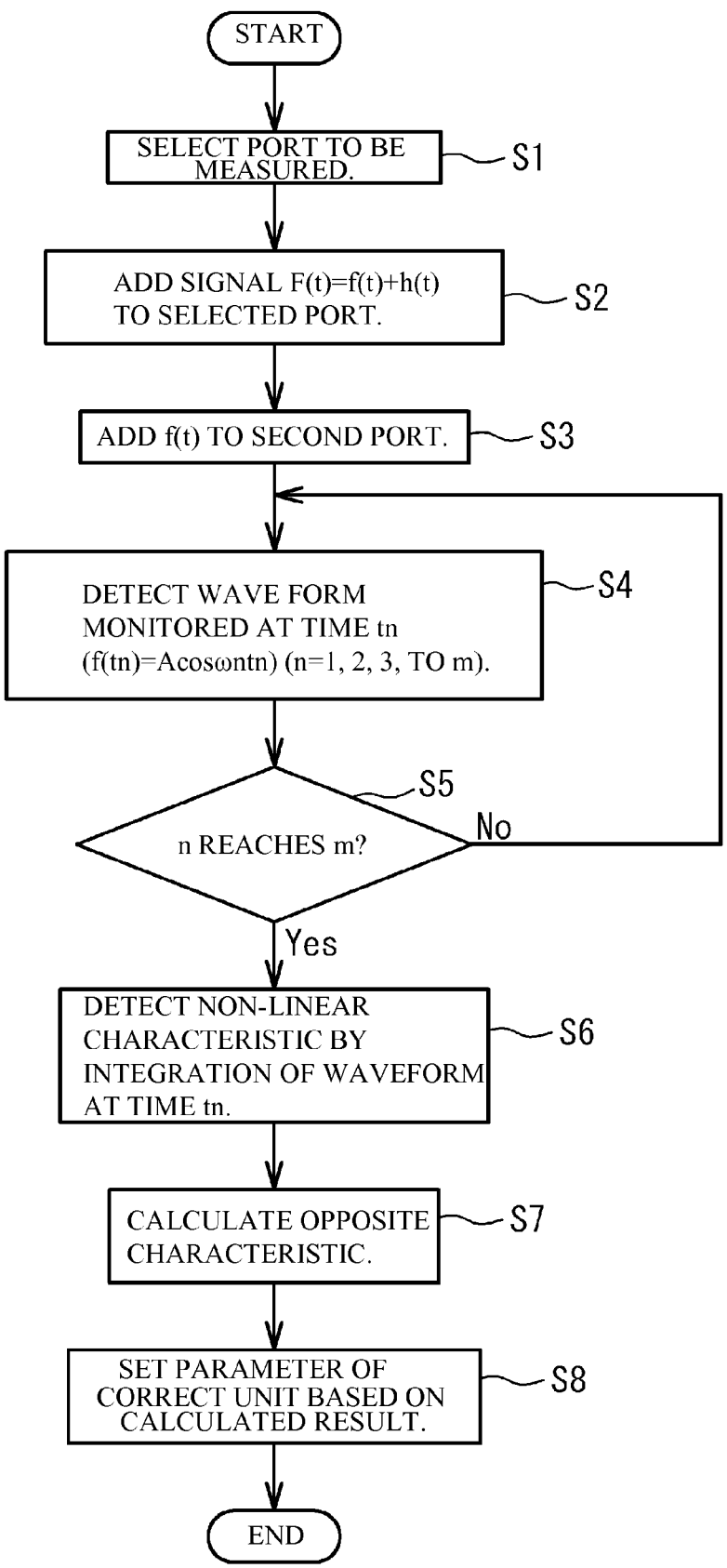
FIG. 7 illustrates an example of a flowchart executed by an optical transmission device in accordance with the first embodiment.

FIG. 7 illustrates an example of a flowchart executed by the optical transmission device 100. With reference to FIG. 7, the digital signal processing unit 10 selects a port to be measured (Step S1). The port to be measured is a combination of one of the Mach-Zehnder modulation units of the QPSK modulation units 33a and 33b and one of the electrical amplifiers 31 applying a signal to the one of the Mach-Zehnder modulation units. Next, the digital signal processing unit 10 applies a drive signal F(t) to the Mach-Zehnder-modulation unit of the selected port (Step S2). Next, the D/A convertor 20 outputs the reference signal f(t) from the second port (Step S3).

Next, the detect unit 44 detects a waveform at a time $t_n$ ($f(t_n)$=A cos $ω_nt_n$) Step S4). "n" is a natural number from "1" to "m". Next, the detect unit 44 determines whether "n" reaches "m" (Step S5). When it is determined as "No" in the Step S5, "n+1" is substituted into "n", and the Step S4 is executed again.

When it is determined as "Yes" in the Step S5, the detect unit 44 detects a non-linear characteristic at each frequency of the electrical amplifier 31 and the Mach-Zehnder modulation unit of the selected port by integrating a waveform at each time $t_n$ (Step S6). Next, the correct unit 45 calculates a characteristic opposite to the non-linear characteristic detected by the detect unit 44 (Step S7). Next, the correct unit 45 sets a parameter of the transmission FE compensate unit 16 so that a calculated opposite characteristic is achieved (Step S8). After that, the execution of the flow chart is terminated. When the flow chart of FIG. 7 is executed with respect to each port, the whole non-linear characteristic of the polarization-multiplexing modulation unit 30 is compensated for.

In accordance with the embodiment, a reflection result of a superimposed signal fluctuating according to the non-linear characteristic of the polarization-multiplexing modulation unit 30. It is therefore possible to detect the non-linear characteristic of the polarization-multiplexing modulation unit 30. And, the parameter of the transmission FE compensate unit 16 is corrected so that the non-linear characteristic is reduced (close to a linear characteristic). Therefore, the non-linear characteristic of the polarization-multiplexing modulation unit 30 can be compensated for. It is therefore possible to improve an effect of a function such as a non-linear pre-equalization of a transmission line performed in the digital signal processing unit 10.

In the embodiment, a polarization-multiplexing modulator is used as the polarization-multiplexing modulation unit 30. However the structure is not limited. A modulator having a Mach-Zehnder modulator in which a non-linear characteristic appears in an extinction characteristic can be applied to the non-linear characteristic compensation of the embodiment. In the embodiment, the amplitude of the reference signal f(t) applied to each modulation unit is set to be 2Vπ. However, the amplitude may be different from 2Vπ.

[Second Embodiment]

Figure 8:
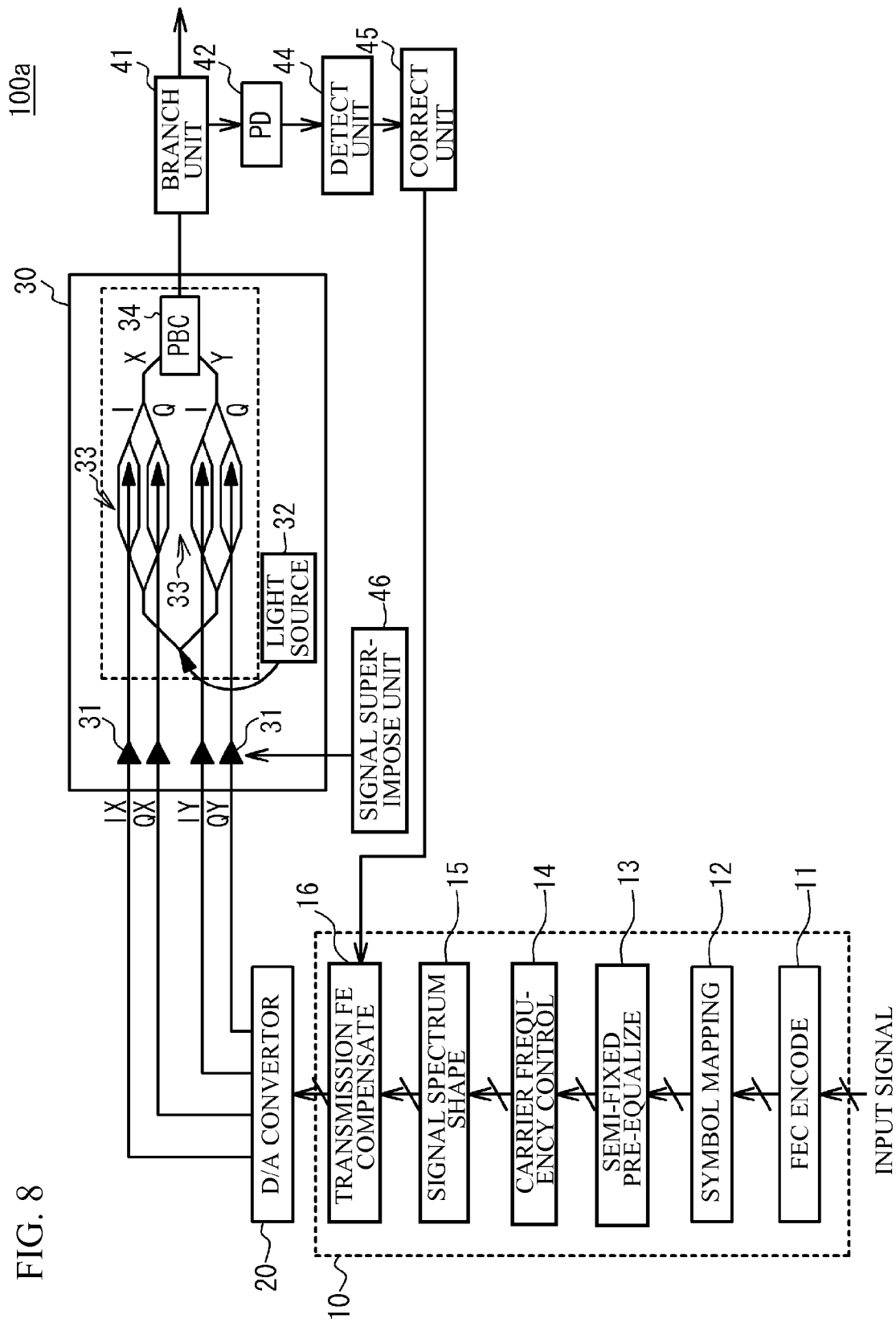
FIG. 8 illustrates a block diagram of a main structure of an optical transmission device in accordance with a second embodiment.

FIG. 8 illustrates a block diagram of a main structure of an optical transmission device 100a in accordance with a second embodiment. With reference to FIG. 8, the optical transmission device 100a is different from the optical transmission device 100 of FIG. 1 in points that the filter 43 is not provided, the D/A convertor 20 does not have the second port, and a signal superimpose unit 46 is provided. In the embodiment, signal amplitude of a drive signal input into each Mach-Zehnder modulation unit is changed in a given period. An average of the signal amplitude is changed. Thereby, the non-linear characteristic of the polarization-multiplexing modulation unit 30 is detected.

The signal superimpose unit 46 inputs a low-frequency signal f0 having a frequency f0 into each electrical amplifier 31. In this case, the low-frequency signal f0 is superimposed to a drive signal output by each electrical amplifier 31 as a superimposed signal. Thus, the signal amplitude of the drive signal output by each electrical amplifier 31 changes in a period of the frequency f0. In the embodiment, the non-linear characteristic of the polarization-multiplexing modulation unit 30 is detected based on a changing of the low-frequency signal f0 in a case where the average amplitude of the drive signal output by the electrical amplifier 31 is changed with the low-frequency signal f0 being superimposed.

Figure 9A:
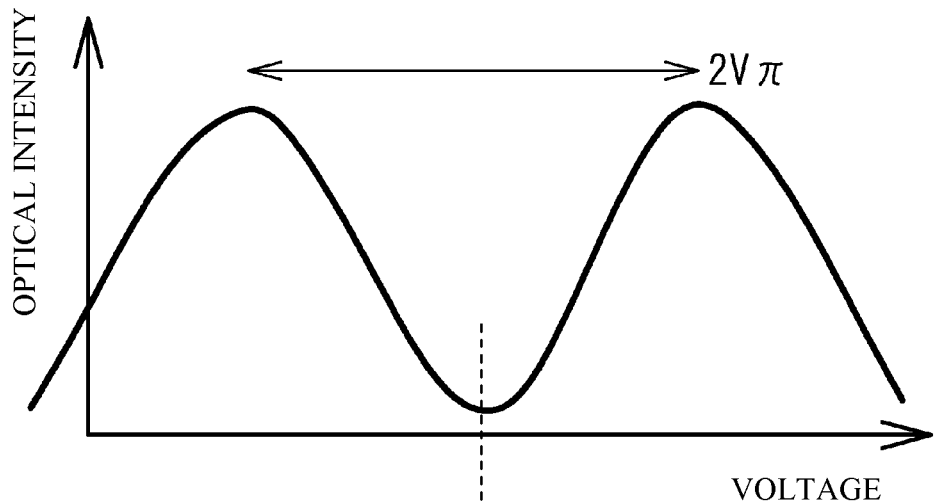
FIG. 9A illustrates an extinction characteristic of a Mach-Zehnder modulation unit.
Figure 9B:
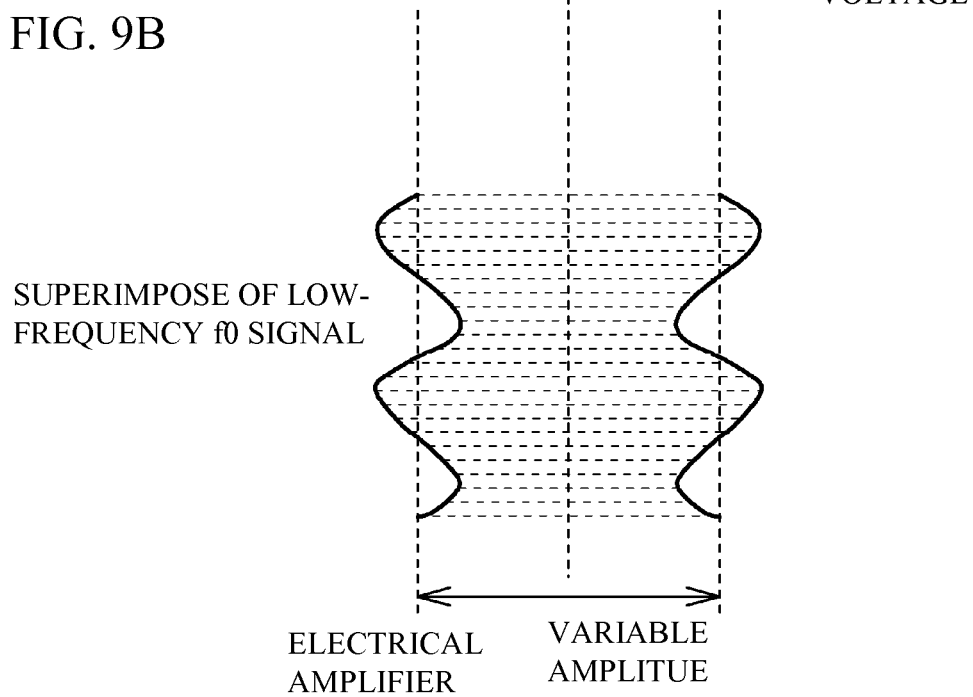
FIG. 9B illustrates amplitude of an electrical amplifier.

FIG. 9A illustrates an extinction characteristic of each Mach-Zehnder modulation unit. A bias voltage is set so that a center voltage of the drive signal output by the electrical amplifier 31 approximately corresponds to a valley (a local minimum value) of the extinction characteristic. This setting is achieved when a normal bias control is performed. Under the condition, with reference to FIG. 9B, the signal superimpose unit 46 superimposes the low-frequency signal f0 at a point where the center voltage of the drive signal corresponds to the valley (a local minimum value) of the extinction characteristic. The digital signal processing unit 10 changes the average amplitude of the drive signal output by the electrical amplifier 31 with the low-frequency signal f0 being superimposed. That is, the digital signal processing unit 10 acts as an amplitude control unit that changes the average amplitude of the drive signal. In this case, because of the non-linear characteristic of the polarization-multiplexing modulation unit 30, the changing of the reflection of the low-frequency signal f0 with respect to the optical signal output by the polarization-multiplexing modulation unit 30 is detected. It is possible to detect the non-linear characteristic of the polarization-multiplexing modulation unit 30, by detecting the changing of the reflection.

Figure 10:
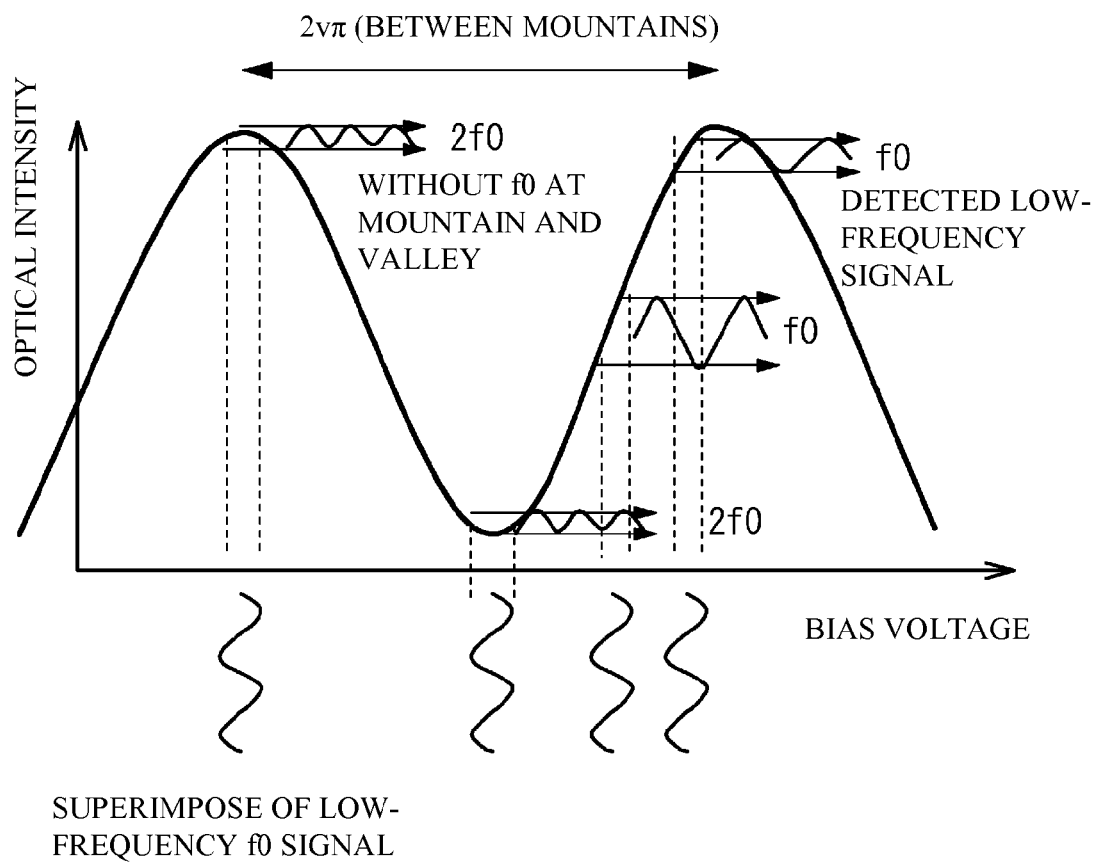
FIG. 10 illustrates an intensity changing of a low-frequency signal according to a changing of amplitude of a drive signal output by an electrical amplifier.

FIG. 10 illustrates an intensity changing of the low-frequency signal f0 according to a changing of amplitude of the drive signal output by the electrical amplifier 31. With reference to FIG. 10, in the extinction characteristic of the Mach-Zehnder modulation unit, an absolute value of an inclination is a maximum value around a center between the mountain (a local maximum value) and the valley (a local minimum value). Thus, a detected intensity of the low-frequency signal f0 becomes maximum. The absolute value of the inclination gets smaller as the position gets away from the center between the mountain (a local maximum) and the valley (a local minimum). Therefore, the intensity of the detected frequency signal f0 gets smaller. Around the mountain (a local maximum) or the valley (a local minimum), a fluctuation range of the low-frequency signal f0 exceeds the mountain (a local maximum) or valley (a local minimum). Therefore, a component of frequency 2f0 can be detected. However, the low-frequency signal f0 is not detected. Therefore, when the amplitude of the drive signal output by the electrical amplifier 31 is 2Vπ, the optical signal output by the polarization-multiplexing modulation unit 30 does not include the low-frequency signal f0. Further, when the drive amplitude output by the electrical amplifier 31 is increased, the low-frequency signal f0 to be superimposed is compressed because of the non-linear characteristic (saturation characteristic) of the electrical amplifier 31. And a detected component gets smaller.

Figure 11A:
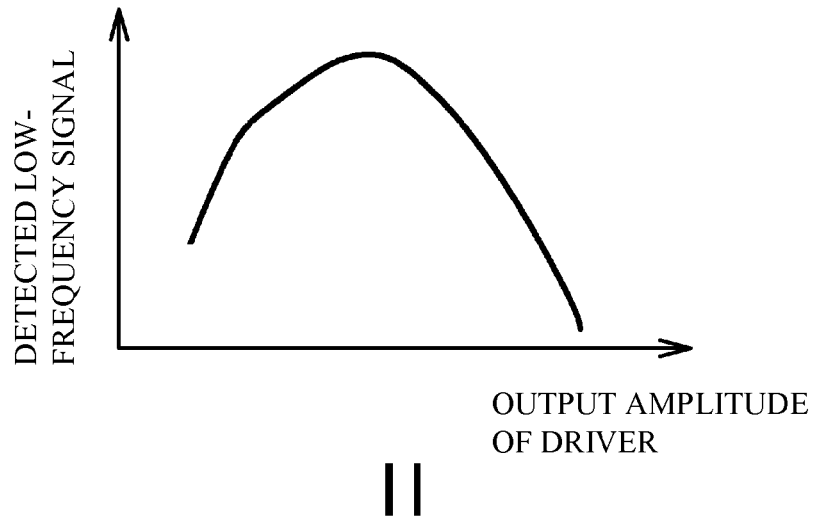
FIG. 11A illustrates a non-linear characteristic in which both non-linear characteristics of FIG. 11B and FIG. 11C are reflected.
Figure 11B:
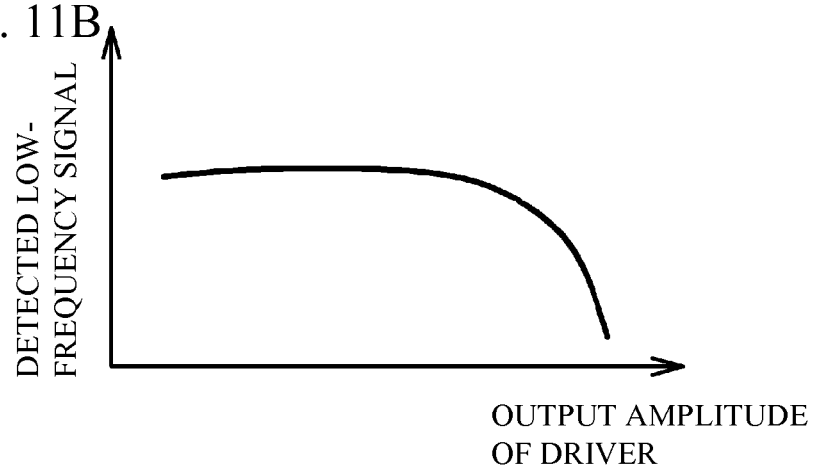
FIG. 11B illustrates an intensity changing of a low-frequency signal caused by a non-linear characteristic of an electrical amplifier.
Figure 11C:
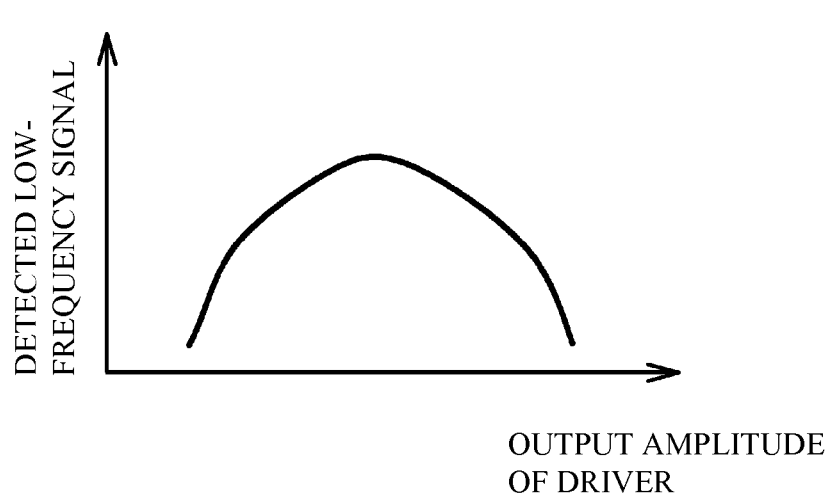
FIG. 11C illustrates an intensity changing of a low-frequency signal caused by a non-linear characteristic of each modulation unit of a polarization multiplexing modulation unit.

FIG. 11B illustrates an intensity changing of the low-frequency signal f0 caused by the non-linear characteristic of the electrical amplifier 31. FIG. 11C illustrates an intensity changing of the low-frequency signal f0 caused by the non-linear characteristic of each modulation unit of the polarization-multiplexing modulation unit 30. FIG. 11A illustrates a non-linear characteristic, the sum of FIG. 11B and FIG. 11C. When the characteristic obtained in FIG. 11A is integrated as well as the first embodiment, the non-linear characteristic of each port of the polarization-multiplexing modulation unit 30 can be obtained.

Figure 12:
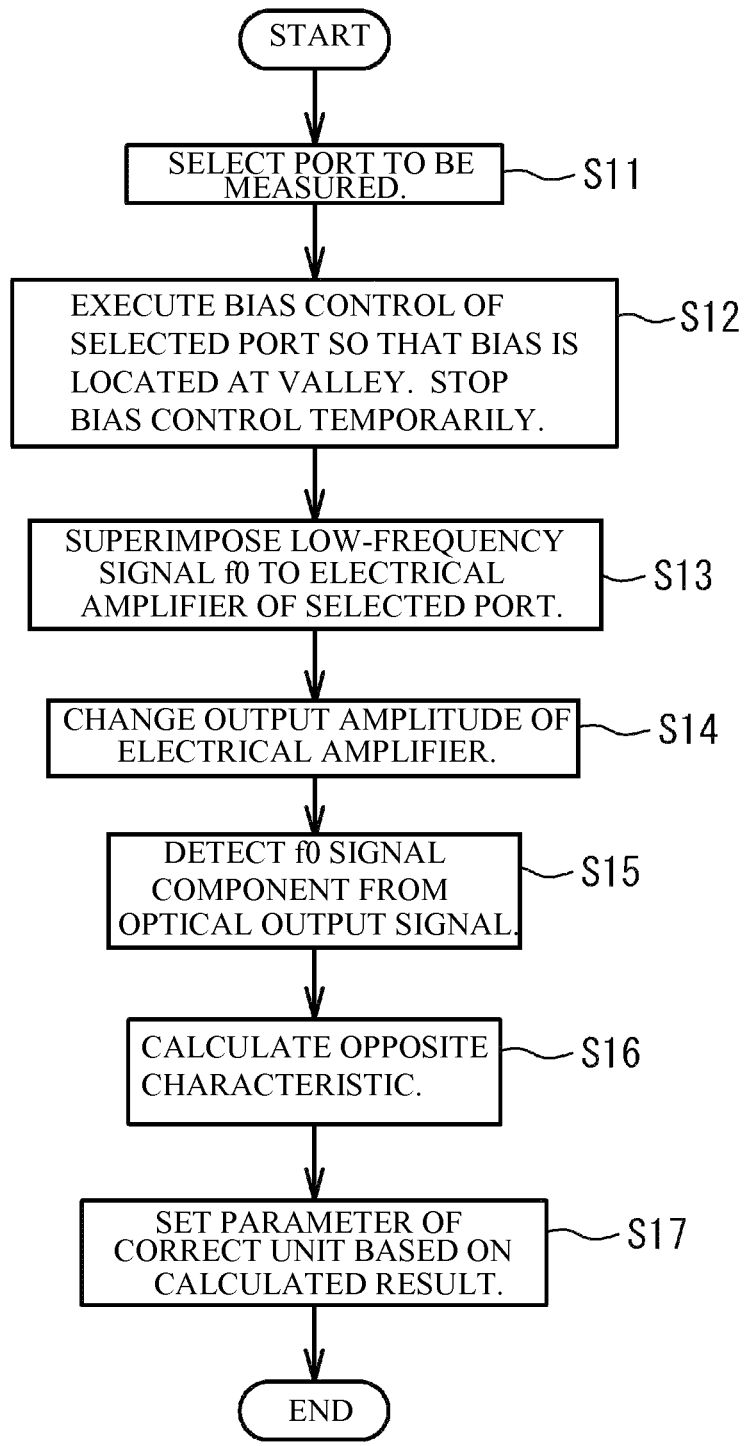
FIG. 12 illustrates an example of a flowchart executed by an optical transmission device in accordance with a second embodiment.

FIG. 12 illustrates an example of a flowchart executed by the optical transmission device 100a. With reference to FIG. 12, the digital signal processing unit 10 selects a port to be measured (Step S11). Here, the port to be measured is a combination of one of Mach-Zehnder modulation units of the QPSK modulation units 33a and 33b and one of the electrical amplifiers 31 that applies a signal to the Mach-Zehnder modulation unit. Next, the digital signal processing unit 10 sets a center of a bias so that the center of the bias corresponds to a valley (local minimum) of an extinction characteristic by executing a bias control of the selected port (Step S12). When the bias is set to be the valley (local minimum) of the extinction characteristic, the bias control is temporarily stopped.

Next, the signal superimpose unit 46 superimposes the low-frequency signal f0 to the electrical amplifier 31 of the selected port (Step S13). Next, the digital signal processing unit 10 changes the average amplitude of the signal output by the electrical amplifier 31 by changing the amplitude of the drive signal input into the electrical amplifier 31 (Step S14). Next, the detect unit 44 detects a non-linear characteristic of the selected port by detecting a signal component according to the low-frequency signal f0 from an optical signal output by the polarization-multiplexing modulation unit 30 (Step S15). Next, the correct unit 45 calculates an opposite characteristic of the non-linear characteristic detected in the Step S15 (Step S16). Next, the correct unit 45 sets a parameter of the transmission FE compensate unit 16 so that the calculated opposite characteristic is achieved (Step S17). After that, the execution of the flow chart is terminated. When the flowchart of FIG. 12 is performed with respect to each port, the non-linear characteristic of the polarization multiplexing modulation unit 30 is compensate for.

In accordance with the embodiment, a result of a superimposed signal changing according to the non-linear characteristic of the polarization-multiplexing modulation unit 30 is detected. It is therefore possible to detect the non-linear characteristic of the polarization-multiplexing modulation unit 30. The parameter of the transmission FE compensate unit 16 is corrected so that the non-linear characteristic is reduced (close to a linear characteristic). Therefore, the non-characteristic of the polarization-multiplexing modulation unit 30 can be compensated for. It is therefore possible to improve the function effect such as a non-linear pre-equalization of a transmission line performed in the digital signal processing unit 10.

In the embodiment, the polarization-multiplexing modulation unit 30 is used as a modulation unit. However, the structure is not limited. The non-linear characteristic compensation can be applied to a modulation unit having a Mach-Zehnder modulation unit in which a non-linear characteristic appears in an extinction characteristic. In the embodiment, the amplitude of the drive signal output by the electrical amplifier 31 is changed by changing the amplitude of the drive signal input into the electrical amplifier 31. However, the structure is not limited. For example, the amplitude of the drive signal output by the electrical amplifier 31 may be changed by changing a gain of the electrical amplifier 31. That is, the electrical amplifier 31 acts as a frequency control unit for changing the average amplitude of the drive signal.

[Third Embodiment]

Figure 13:
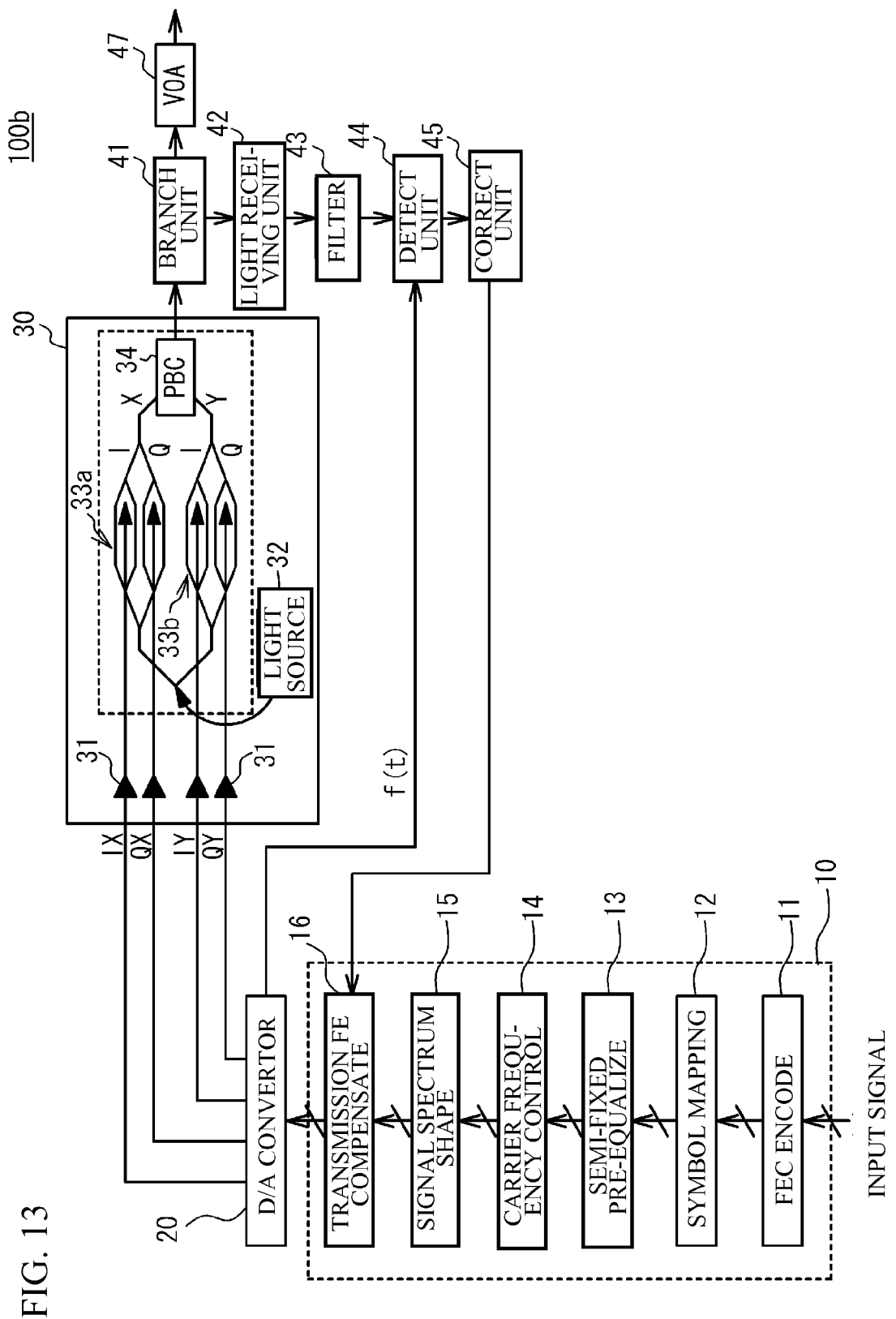
FIG. 13 illustrates a block diagram of a main structure of an optical transmission device in accordance with a third embodiment.

FIG. 13 illustrates a block diagram of a main structure of an optical transmission device 100*b* in accordance with a third embodiment. With reference to FIG. 13, the optical transmission device 100*b* is different from the optical transmission device 100 of FIG. 1 in a point that a VOA (Variable Optical Attenuator) 47 is provided. The variable optical attenuator 47 is provided after the branch unit 41 and adjusts an optical intensity of a modulation signal output by the polarization-multiplexing modulation unit 30. For example, the variable optical attenuator 47 may acts as a shut unit that shuts off the outputting of the optical signal from the polarization-multiplexing modulation unit 30. Therefore, the non-linear characteristic of the polarization-multiplexing modulation unit 30 may be detected after the outputting of the modulation signal from the polarization-multiplexing modulation unit 30 is shut off, and the parameter of the transmission FE compensate unit 16 may be set. In this case, it is suppressed that an outer component is broken down because of the modulation signal output during detecting the non-linear characteristic. In the optical transmission device 100*a* in accordance with the second embodiment, the variable optical attenuator 47 may be provided after the branch unit 41.

[Another Example]

Figure 14:
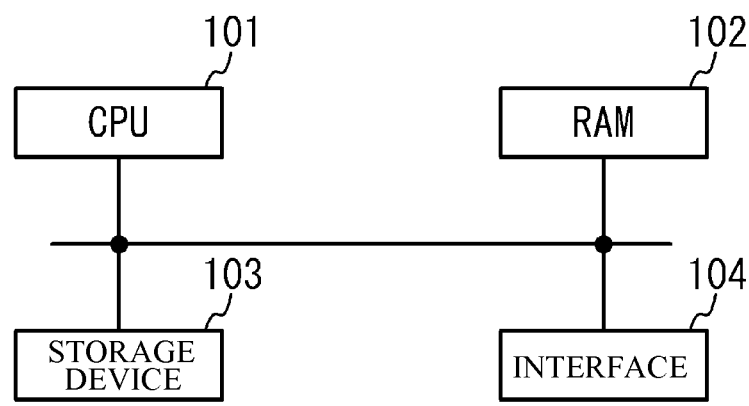
FIG. 14 illustrates a block diagram of a hardware structure of a detect unit and a correct unit.

FIG. 14 illustrates a block diagram of a hardware structure of the digital signal processing unit 10, the detect unit 44 and the correct unit 45. With reference to FIG. 14, the digital signal processing unit 10, the detect unit 44 and the correct unit 45 have a CPU 101, a RAM 102, a storage device 103, an interface 104 and so on. These components are connected via a bus or the like. The CPU 101 is a Central Processing Unit. The CPU 101 includes one or more core. The RAM (Random Access Memory) 102 is a volatile memory for temporarily storing a program executed by the CPU 101, a data processed by the CPU 101 and so on. The storage device 103 is non-volatile storage device. A ROM (Read Only Memory), a solid state drive (SSD) such as a flash memory, a hard disk driven by a hard disk drive or the like can be used as the storage device 103. When the CPU 101 executes a predetermined program, the digital signal processing unit 10, the detect unit 44 and the correct unit 45 are realized in the optical transmission devices 100, 100*a* and 100*b*. The digital signal processing unit 10, the detect unit 44 and the correct unit 45 may be a hardware such as a dedicated circuit or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical transmission device comprising:
a drive signal generate unit that generates a drive signal;
a modulation unit that modulates an optical signal in accordance with the drive signal;
a detect unit that detects a fluctuation of a signal component of the drive signal with respect to an optical signal output by the modulation unit;
an input unit that inputs a component other than the signal component of the drive signal into the detect unit without the modulation unit as a reference signal; and
a correct unit that corrects a parameter of the drive signal generate unit in accordance with a detect result of the detect unit so that in a voltage range of the drive signal where a non-linear characteristic of the modulation unit appears, the non-linear characteristic of the modulation unit corresponding to a voltage value of the drive signal gets closer to a linear characteristic at the voltage value,
wherein:
the detect unit detects the fluctuation of the signal component with use of the reference signal;
the reference signal is a signal of which frequency changes with time; and
the signal component is a signal that has a fixed frequency and has amplitude smaller than that of the reference signal.

2. The optical transmission device as claimed in claim 1, further comprising:
a shut unit that shuts off an outputting of an optical signal from the modulation unit.

3. The optical transmission device as claimed in claim 1, wherein:
the voltage value of the drive signal has amplitude; and
the correct unit corrects the parameter of the drive signal generate unit so that in the voltage range of the drive signal where the non-linear characteristic of the modulation unit appears, the non-linear characteristic of the modulation unit corresponding to the voltage value of the drive signal gets closer to the linear characteristic at a same voltage value as the voltage value.

4. An optical transmission device comprising:
a drive signal generate unit that generates a drive signal;
a modulation unit that modulates an optical signal in accordance with the drive signal;
an electrical amplifier that amplifies the drive signal before the drive signal is applied to the modulation unit;
an amplitude control unit that changes an average amplitude of an output signal of the electrical amplifier,
a detect unit that detects a fluctuation of a signal component of the drive signal with respect to an optical signal output by the modulation unit; and
a correct unit that corrects a parameter of the drive signal generate unit in accordance with a detect result of the detect unit so that in a voltage range of the drive signal where a non-linear characteristic of the modulation unit appears, the non-linear characteristic of the modulation unit corresponding to a voltage value of the drive signal gets closer to a linear characteristic at the voltage value, wherein:
the signal component is a signal that has a frequency to change amplitude of the output signal of the electrical amplifier fluctuate cyclically; and
the detect unit detects the fluctuation of the signal component in accordance with a changing of the average amplitude by the amplitude control unit.

5. The optical transmission device as claimed in claim 4, further comprising:
a shut unit that shuts off an outputting of an optical signal from the modulation unit.

6. The optical transmission device as claimed in claim 4, wherein:
the voltage value of the drive signal has amplitude; and
the correct unit corrects the parameter of the drive signal generate unit so that in the voltage range of the drive signal where the non-linear characteristic of the modulation unit appears, the non-linear characteristic of the modulation unit corresponding to the voltage value of the drive signal gets closer to the linear characteristic at a same voltage value as the voltage value.

7. A method of optical transmission comprising:
generating a drive signal;
making a modulation unit modulate an optical signal in accordance with the drive signal;
by a detect unit, detecting a fluctuation of a signal component of the drive signal with respect to an optical signal output by the modulation unit;
inputting a component other than the signal component of the drive signal into the detect unit without the modulation unit as a reference signal; and
correcting a parameter of a device to generate the drive signal in accordance with a detect result of the detect unit so that in a voltage range of the drive signal where a non-linear characteristic of the modulation unit appears, the non-linear characteristic of the modulation unit corresponding to a voltage value of the drive signal gets closer to a linear characteristic at the voltage value,
wherein:
in the detecting, the fluctuation of the signal component is detected with use of the reference signal;
the reference signal is a signal of which frequency changes with time; and
the signal component is a signal that has a fixed frequency and has amplitude smaller than that of the reference signal.

8. The method as claimed in claim 7, wherein:
the voltage value of the drive signal has amplitude; and
in the correcting, the parameter of the drive signal generate unit is corrected so that in the voltage range of the drive signal where the non-linear characteristic of the modulation unit appears, the non-linear characteristic of the modulation unit corresponding to the voltage value of the drive signal gets closer to the linear characteristic at a same voltage value as the voltage value.

* * * * *